(12) United States Patent
Cetrulo et al.

(10) Patent No.: US 7,915,570 B2
(45) Date of Patent: Mar. 29, 2011

(54) SMART CAMERA WITH AN INTEGRATED LIGHTING CONTROLLER

(75) Inventors: Raffaele A. Cetrulo, Austin, TX (US); William M. Allai, Austin, TX (US); Anita L. Salmon, Austin, TX (US); Darin J. Shaw, Round Rock, TX (US); Nicolas Vazquez, Austin, TX (US)

(73) Assignee: National Instruments Corporation, Austin, TX (US)

( * ) Notice: Subject to any disclaimer, the term of this patent is extended or adjusted under 35 U.S.C. 154(b) by 368 days.

(21) Appl. No.: 12/184,931

(22) Filed: Aug. 1, 2008

(65) Prior Publication Data

US 2009/0033761 A1 Feb. 5, 2009

Related U.S. Application Data

(60) Provisional application No. 60/953,889, filed on Aug. 3, 2007.

(51) Int. Cl.
*G01J 1/32* (2006.01)
*H05B 37/02* (2006.01)

(52) U.S. Cl. .................. 250/205; 315/308

(58) Field of Classification Search .......... 250/205; 315/308
See application file for complete search history.

(56) References Cited

U.S. PATENT DOCUMENTS

| | | | |
|---|---|---|---|
| 5,134,469 A * | 7/1992 | Uchimura | 348/68 |
| 5,172,005 A | 12/1992 | Cochran et al. | |
| 5,625,483 A | 4/1997 | Swartz et al. | |
| 5,986,414 A | 11/1999 | Bocchicchio et al. | |
| 6,207,946 B1 | 3/2001 | Jusoh et al. | |
| 6,522,777 B1 | 2/2003 | Paulsen et al. | |
| 6,603,103 B1 | 8/2003 | Ulrich et al. | |
| 6,950,196 B2 | 9/2005 | Fielden et al. | |
| 6,956,963 B2 | 10/2005 | Ulrich et al. | |
| 6,963,175 B2 | 11/2005 | Archenhold et al. | |
| 7,127,159 B2 | 10/2006 | Gladnick et al. | |
| 7,178,941 B2 | 2/2007 | Roberge et al. | |
| 7,259,522 B2 | 8/2007 | Toyota et al. | |
| 7,331,681 B2 | 2/2008 | Pohlert et al. | |
| 7,397,550 B2 | 7/2008 | Hackney et al. | |
| 2004/0129860 A1* | 7/2004 | Thibaud et al. | 250/205 |
| 2005/0236998 A1 | 10/2005 | Mueller et al. | |
| 2006/0032921 A1 | 2/2006 | Gerst, III et al. | |

OTHER PUBLICATIONS

"Legend 540"; DVT Machine Vision; 2004; 2 Pages.
"PresencePLUS Vision Sensors"; Second Edition; Banner Engineering Corp.; 2005; 36 Pages.
"Cognex Checker"; Cognex Corporation; 2005; 6 Pages.
"Cognex DVT LineScan Users Guide"; Cognex Corporation; 20 Pages; Accessed from Internet Jan. 15, 2009; http://www.cognexsensors.com/support/DownloadsManager.php?Order=Index&KW=DVT%20Manual#.
"Cognex MVS-8000 Series: MVS-8100L Hardware Manual"; Cognex Corporation; Oct. 2006; 40 Pages.

(Continued)

*Primary Examiner* — Thanh X Luu
(74) *Attorney, Agent, or Firm* — Meyertons Hood Kivlin Kowert & Goetzel, P.C.; Jeffrey C. Hood

(57) ABSTRACT

A smart camera includes an integrated lighting current controller and can couple to one or more external light sources. The integrated lighting current controller can control and power the one or more external light sources using a current pulse. The one or more external light sources can provide illumination for the smart camera to acquire the image of an object under test.

25 Claims, 11 Drawing Sheets

OTHER PUBLICATIONS

"Installing the In-Sight 3000"; Cognex Corporation; 2002; 43 Pages.
"In-Sight Strobe Light Adapter Installation & Reference"; Cognex Corporation; 2002; 18 Pages.
"Tech Note: Connecting a Strobe Device to the In-Sight 1000 and 4000 Series Vision Sensors"; Cognex Corporation; 2003; 12 Pages.
"SmartImage Sensor Installation and User Guide, 7th Edition"; DVT Corporation; Aug. 2003; 157 Pages.
"FrameWork"; DVT Corporation; 2004; 2 Pages.
"Modular Lighting Controller (MLC)"; ETS-Lindgren; 2003; 2 Pages.
"PP600—LED Lighting Controller for NERLITE MV Lighting Components"; Siemens; 2003; 2 Pages.
"Installation of TPS-28 Universal Lighting Power Supply"; Executive Engineering; May 2004; 25 Pages.
"Signatech Intensity Controller Manual MS210 / MS220 / CS410 / CS420"; Advanced Illumination; Feb. 2006; 18 Pages.
"Pulsar 710 Controller Operator's Manual & Installation Guide"; Advanced Illumination; Oct. 2005; 40 Pages.
"Signatech Controller Manual S4000 / S6000 / S6000-AS" Advanced Illumination; Oct. 2006; 17 Pages.
"Application Note—PP860 Heat Output"; Gardasoft Vision; Sep. 29, 2006; 1 Page.
"Application Note—PP500 Heat Output"; Gardasoft Vision; 2003; 2 Pages.
"SCM Strobe Control Module"; Banner Engineering Corp.; May 2001; 4 Pages.
"PD2-1012—PD2 Series Digital Type"; CCS; 2006; Accessed from Internet at http://www.ccs-inc.co.jp/cgi-bin/hp.cgi?menu=102-201-02-01e.
"PS-3012-D24 Strobe Power Supply"; CCS; 2006; Accessed from Internet at http://www.ccs-inc.co.jp/cgi-bin/hp.cgi?menu=102-201-10-01e.
"Cognex Product Guide 2007"; Cognex Corporation; 2007; 10 Pages.
"App 909—PP600 Heat Output"; Gardasoft Vision; 2003; 2 Pages.
"PP500 Range—LED Lighting Controller with Ethernet Interface"; Gardasoft Vision; 2006; 2 Pages.
"PP600 Series LED Lighting Controller" Gardasoft Vision; 2003; 2 Pages.
"The PP860 Series High Current LED Lighting Controllers"; Gardasoft Vision; 2006; 2 Pages.
"Gardasoft Vision User Manual—PP500, PP520, PP500F, PP520F LED Lighting Controllers"; Revision 08; Gardasoft Vision; 2007; 28 Pages.
"Gardasoft Vision User Manual—PP600, PP602, PP610, PP612 LED Lighting Controllers"; Revision 13; Gardasoft Vision; 2006; 32 Pages.
"Gardasoft Vision User Manual—PP600F, PP602F, PP610F, PP612F LED Lighting Controllers"; Revision 10; Gardasoft Vision; 2003; 32 Pages.
"PP610—LED Lighting Controller with RS232 Control for NERLITE MV Lighting Components"; Siemens; 2003; 2 Pages.
"NERLITE SCM-1 Strobe Control Module, M/D"; Siemens; 2003; 2 Pages.

* cited by examiner

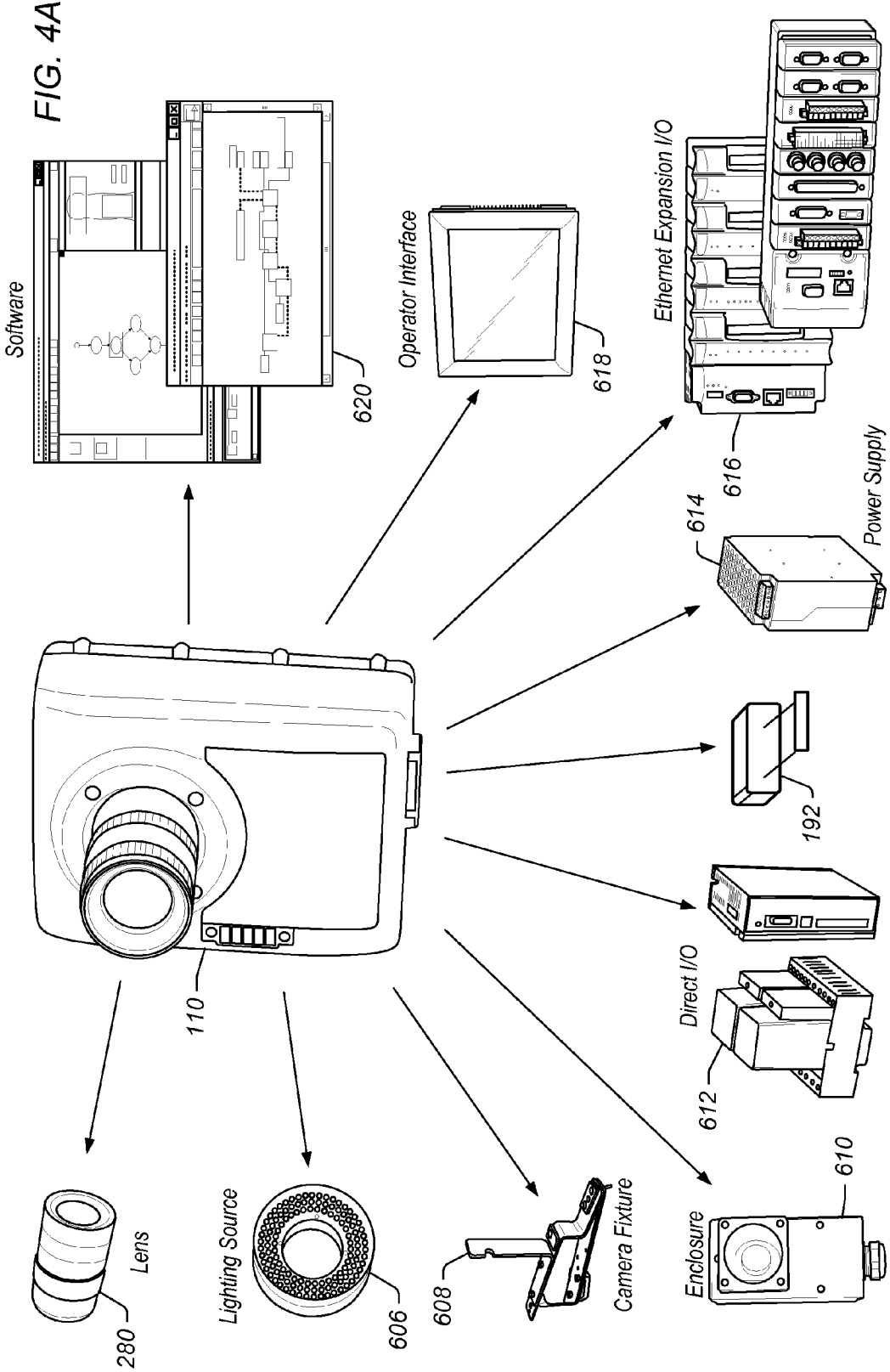

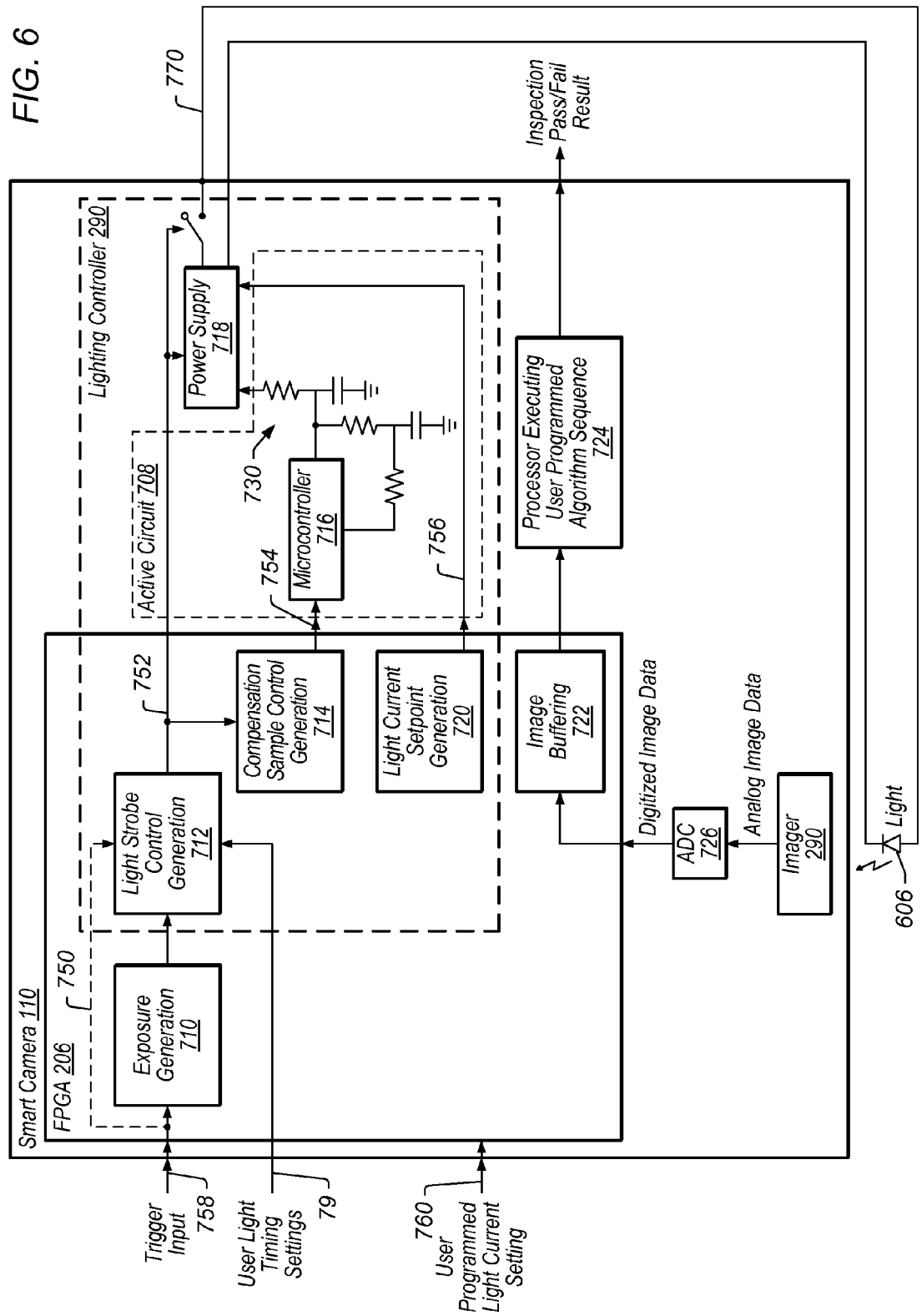

SMART CAMERA WITH AN INTEGRATED LIGHTING CONTROLLER

PRIORITY CLAIM

This application claims priority to provisional patent application No. 60/953,889 titled "New Architecture for Industrial Camera Lighting Circuit with High Power Density and Long Strobe Intervals," to Cetrulo et al., filed on Aug. 3, 2007.

FIELD OF THE INVENTION

The present invention relates to the field of machine vision, and more particularly to a smart camera with an integrated lighting current controller.

DESCRIPTION OF THE RELATED ART

In many applications, machine vision or image processing analysis is used to inspect or locate an object. For example, in manufacturing applications, machine vision analysis may be used to detect defects in a manufactured object by acquiring images of the object and using various types of image processing algorithms to analyze the images. As an example, a system to manufacture electrical components such as capacitors may use machine vision to examine respective sides of the capacitors in order to detect manufacturing defects, ensure that the capacitors are labeled, marked, or color coded properly, etc.

Machine vision applications may use image processing software operable to perform any of various types of image analysis or image processing functions or algorithms in examining an acquired image of an object. Any type of camera or other device may be used to acquire the images to be analyzed in a machine vision application, including digital cameras, line scan cameras, infrared imaging devices, x-ray imaging devices, ultra-sonic imaging devices, and any other type of device which operates to receive, generate, process, or acquire an image or sensor data.

Typically, the image processing and analysis of image data is performed by a computing system which may be coupled to the camera. Increasingly, however, such image processing capabilities are performed by the camera or sensor by hardware and/or software "on-board" the device. The term "smart camera" is intended to include any of various types of devices that include a camera or other image sensor and a functional unit (i.e., a processor/memory and/or programmable hardware, such as a field programmable gate array (FPGA)) capable of being configured to perform an image processing function to analyze or process an acquired image. Examples of smart cameras include: NAVSYS Corporation's GI-EYE, which generates digital image data that are automatically tagged with geo-registration meta-data to indicate the precise position and attitude of the camera when the image was taken; Vision Components' GmbH Smart Machine Vision Cameras, which integrate a high-resolution Charge Coupled Device (CCD) sensor with a fast image-processing signal processor, and provide various interfaces to allow communication with the outside world; and Visual Inspection Systems' SMART cameras with on-board DSP capabilities, including frame grabbers and robot guidance systems, among others.

Lighting controllers may be used to power lightheads (light sources) that provide illumination of objects to be imaged. Lighting controllers can use either voltage or current to control and power light sources. Lighting current controllers can provide either continuous or strobed current at variable current levels as required for the application, determined by factors such as ambient light conditions and required exposure time. Existing lighting current controllers generally use linear power supply designs which are bulky, heavy, and hot. Various existing approaches to use light sources with a camera in machine vision/image processing applications are described below. Examples of lighting controllers include BANNER PRESENCE and SCM products, ETS-LINDGREN MODULAR LIGHTING CONTROLLER, ADVANCED ILLUMINATION SIGNATECH S4000/6000 and PULSAR products, SIEMENS PP610 product, and GARDASOFT PP420 product, among others.

A first approach may use an external lighting current controller along with an external power supply. This approach works well but requires additional and external components, e.g., an external lighting current controller, and sometimes an additional power supply. Furthermore, if the lighting current controller and/or the power supply use regular linear power, then the power draw and/or heat dissipation may become an issue and may need bigger power supplies and/or heat dissipation devices. Some heat dissipation devices, such as fans, may be undesirable due to added complexity and cost, as well as additional reliability issues.

Another approach may utilize integrated lights, such as LED's or other light sources, built into a smart camera. However, the integrated lights on a smart camera (e.g., integrated illumination) do not provide the quality and intensity and variety of configurations needed for many machine vision applications. Systems with integrated lights do not have the ability to directly control and/or power external light sources. As a result, if the user's illumination requirements can not be met by the limited selection of integrated lights provided by the manufacturer, this approach does not solve the user's application.

Furthermore, the built-in lighting solutions mainly use a voltage signal to control and power the built-in LED(s). The brightness of an LED is usually controlled by the amount of current through the LED. Using an unregulated or regulated voltage signal that is, by some mechanism, converted to current is not accurate, and precludes the possibility of overdriving the LED(s) in a strobing application.

SUMMARY OF THE INVENTION

Various embodiments of a smart camera system with an integrated lighting current controller are presented below. In some embodiments, the smart camera may comprise a processing unit, imager, memory, and an integrated (i.e., built-in) lighting current controller. The smart camera may include a housing containing all the elements of the smart camera. The smart camera may also use a built-in imager for image acquisition, or alternatively it may connect to an external imager/lens/camera for analog or digital image acquisition.

The integrated lighting current controller may be operable to couple to one or more external light sources, which may be regular of-the-shelf lighting sources such as LED's or other lights. The lighting current controller may be able to strobe the lights substantially around the time of the exposure, and possibly right before the exposure, such that the unit under test has the desired lighting when the exposure is taken.

The lighting current controller uses a switching power supply that minimizes power dissipation, and because of its limited power dissipation, it can be integrated into the smart camera. The lighting current controller can control and power the light source by generating a current pulse from the switching power supply (while in the active state). The switching power supply may receive a pulse-width-modulated (PWM) signal that controls it output, and the PWM signal itself may be controlled by a control loop on the input on the power supply. During intervals when it is desirable not to send any current through the light source, the light source may be disconnected from the output of the switching power supply. During these intervals the switching power supply cannot continue to regulate its current output unless a dummy load were connected and thus provide an alternate path for the current output. However, using a dummy load would waste power and increase heat output.

Instead, during intervals when the light source is disconnected, the switching power supply may be turned off. Since these intervals are unknown (may be short or long depending on the application) and since during this time the switching power supply is not operating, the values of the components in the control loop may decay with time. Once the control loop/switching power supply is inactive, the power supply may take a while to reach the active state again with the desired current accuracy.

Thus an active circuit can sample and hold the control values, and thus provide the necessary fast response time to achieve full current accuracy. This can be implemented using a microcontroller having ADC (analog-to-digital converter) and PWM (pulse width modulation) capabilities. With the active circuit, a memory of the control variables can be maintained from when the control loop was regulating the output current. The active circuit memory enables the lighting current controller to keep the control loop in an inactive state, and ready for a quick return from the inactive state to the active state, thus providing the desired current signal. As a result, the integrated lighting current controller may be operable to control the one or more external light sources using a current signal to provide illumination for acquisition of an image of an object.

It is noted that the examples presented above are meant to be illustrative only, and are not intended to limit the functionality or use of the integrated lighting current controller.

BRIEF DESCRIPTION OF THE DRAWINGS

A better understanding of the present invention can be obtained when the following detailed description of the preferred embodiment is considered in conjunction with the following drawings, in which:

FIGS. 4A-C are illustration of various components that can connect to a smart camera with an integrated lighting current controller, according to some embodiments of the invention;

FIG. 6 is a block diagram of a smart camera with an integrated lighting current controller, according to one embodiment.

Figure 1:
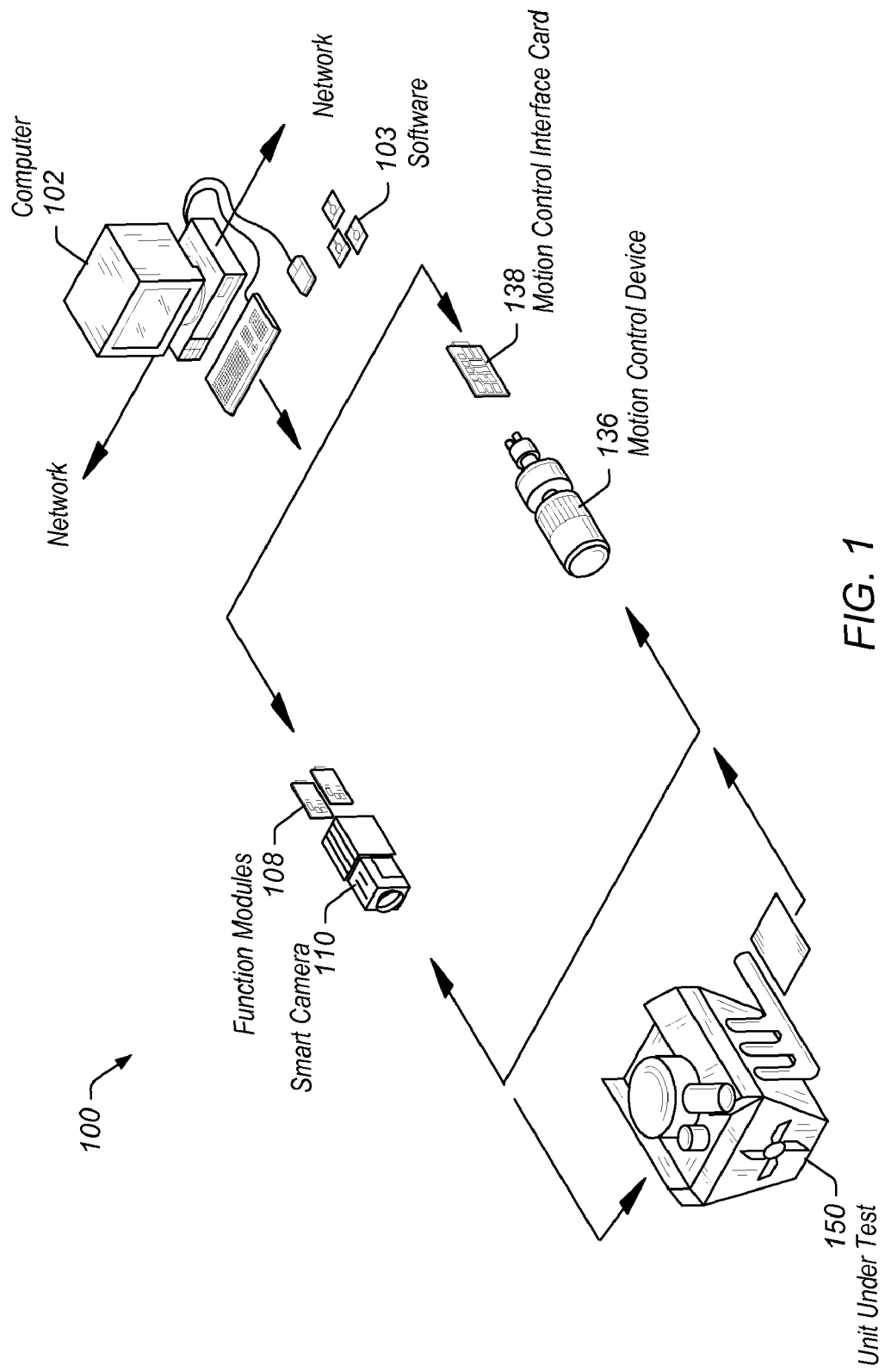
FIG. 1 illustrates various embodiments of a general image acquisition system.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Incorporation by Reference

The following references are hereby incorporated by reference in their entirety as though fully and completely set forth herein:

Provisional U.S. Patent Application No. 60/953,889 titled "New Architecture for Industrial Camera Lighting Circuit with High Power Density and Long Strobe Intervals," to Cetrulo et al., filed on Aug. 3, 2007.

U.S. Pat. No. 7,327,396 titled "Smart Camera with Modular Expansion Capability," to Schultz et al., issued on Feb. 5, 2008.

FIG. 1—Image Acquisition or Machine Vision System

FIG. 1 illustrates an image acquisition system in which a host computer system 102 is coupled to a smart camera 110. As used herein, the term "smart camera" is intended to include any of various types of devices that are operable to acquire and/or store an image and which include on-board processing capabilities. A smart camera may thus be further operable to analyze or process the acquired or stored image. Examples of a smart camera include analog and digital cameras with on-board processors, and other similar types of devices. The smart camera may also include all the elements shown in FIGS. 5-7 without the chassis. Thus the smart camera may be built into a custom chassis at a later time.

As used herein, the term "functional unit" may include a processor and memory or a programmable hardware element. The term "functional unit" may include one or more processors and memories and/or one or more programmable hardware elements. As used herein, the term "memory medium" includes a non-volatile medium, e.g., a magnetic media or hard disk, optical storage, or flash memory; a volatile medium, such as SDRAM memory.

Thus, FIG. 1 illustrates an exemplary image acquisition or machine vision system 100, where the smart camera 110 may include a functional unit for performing an image processing function as described below. The smart camera 110 may include one or more function modules 108 which may provide various additional functions for the smart camera as will be described below. The smart camera 110 may couple to the host computer 102 through a serial bus, a network, or through other means.

The host computer 102 may comprise a CPU, a display screen, memory, and one or more input devices such as a mouse or keyboard as shown. The computer 102 may operate with the smart camera 110 to analyze, measure or control a device or process 150. Alternatively, the computer 102 may be used only to configure a functional unit in the image acquisition device or one or more of the function modules 108. In other embodiments, the computer 102 may be omitted, i.e., the smart camera 110 may operate completely independent of the computer.

The image acquisition system 100 may be used in a manufacturing assembly, test, measurement, automation, and/or control application, among others. For illustration purposes, a unit under test (UUT) 150 is shown which may be positioned by a motion control device 136 (and interface card 138), and imaged and analyzed by the smart camera 110. It is noted that in various other embodiments the UUT 150 may comprise a process or system to be measured and/or analyzed.

The smart camera 110 may include a memory medium on which computer programs, e.g., text based or graphical programs, may be stored. In other embodiments, configuration information may be stored which may be used to configure a programmable hardware element, such as a field programmable gate array (FPGA), comprised in the smart camera (or a function module, or the computer) to perform a measurement, control, automation, or analysis function, among others.

The host computer 102 may also include a memory medium on which computer programs may be stored. In one embodiment, another memory medium may be located on a second computer which is coupled to the smart camera 110 or to the host computer 102 through a network, such as a local area network (LAN), a wide area network (WAN), a wireless network, or the Internet. In this instance, the second computer may operate to provide the program instructions through the network to the smart camera 110 or host computer 102 for execution.

Figure 2A:
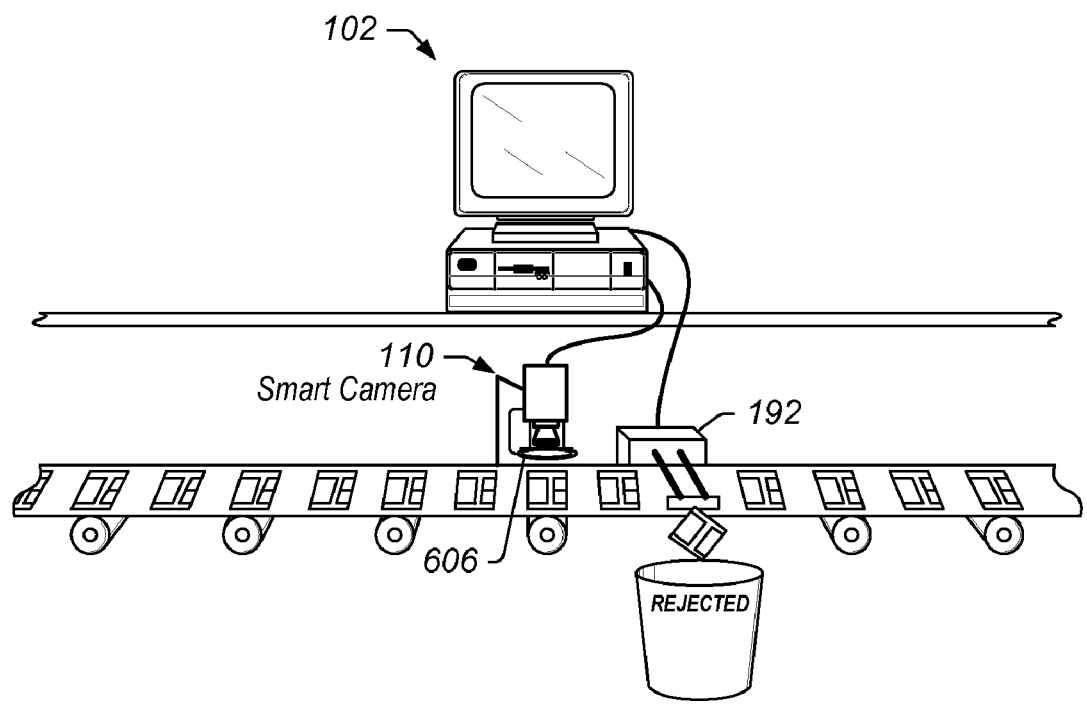
FIGS. 2 A-C illustrate various embodiments of an image acquisition/processing system for inspecting manufactured objects.
Figure 2B:
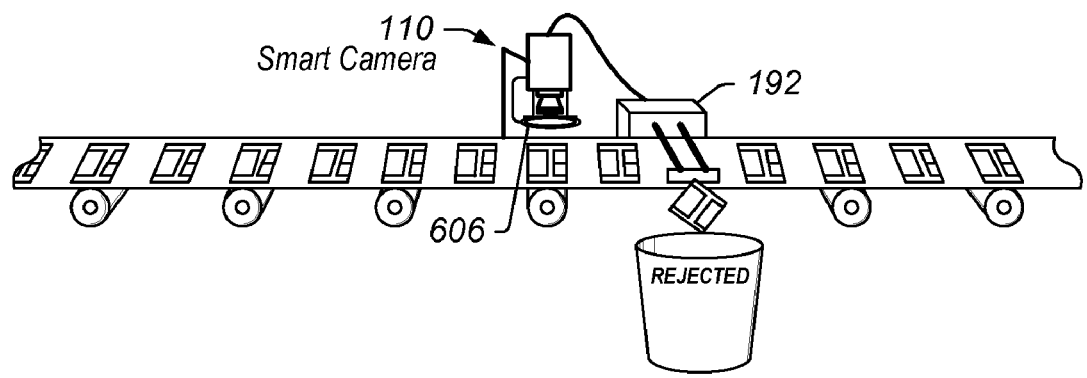
Figure 2C:
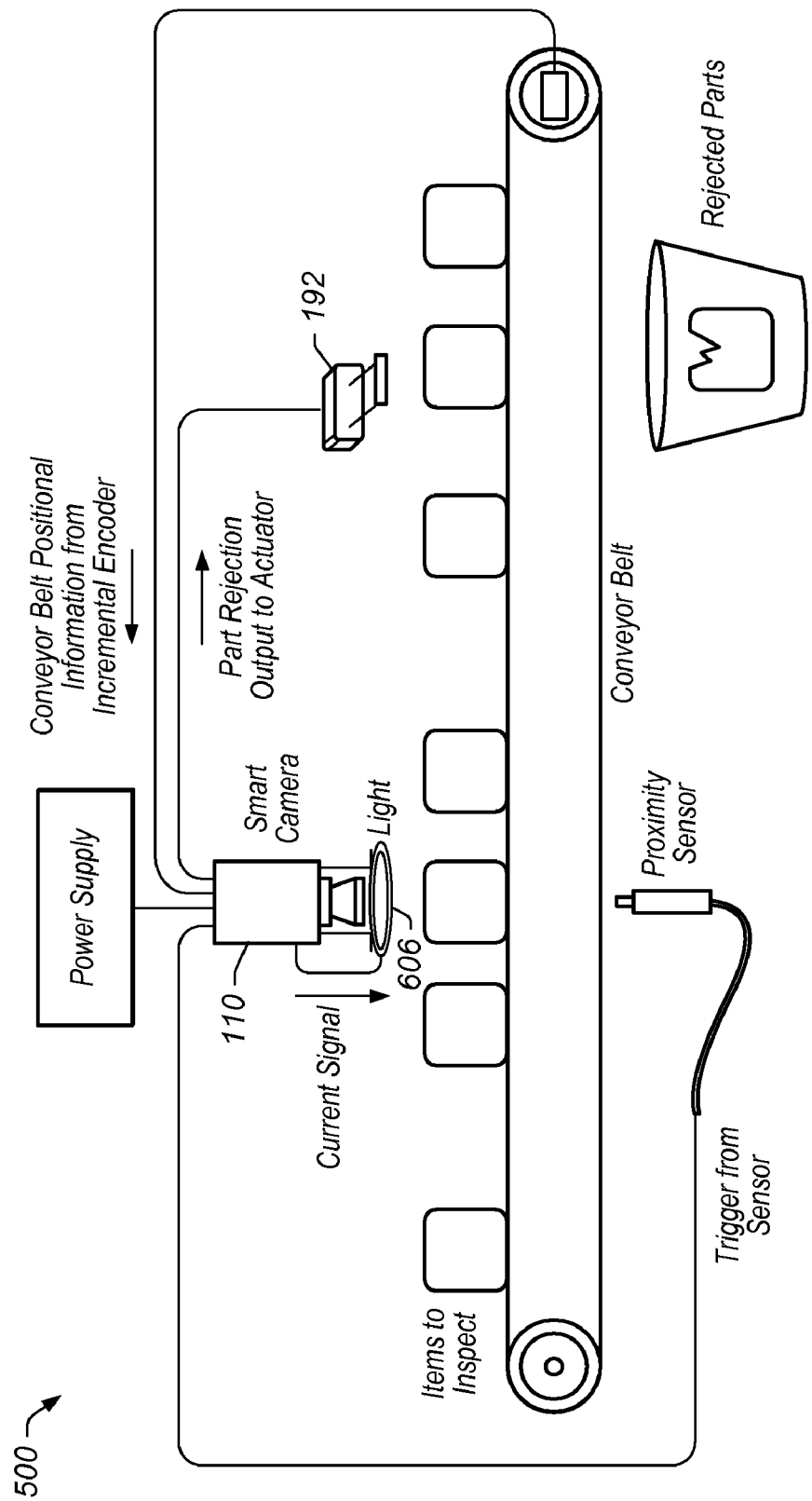

FIGS. 2 A-C—Image Processing Systems

FIGS. 2 A-C illustrate image processing or machine vision systems 500 according to various embodiments of the invention. The image processing system of FIG. 2A may comprise a computer 102 and a smart camera 110, and may further include an actuator (e.g., a motion control device) 192. In one embodiment, the image processing system of FIG. 2B may comprise smart camera 110 and motion control device 192, and may not include computer system 102.

The smart camera 110 may include a digital camera that acquires a digital video signal which comprises an image, or a sequence of images, or other data desired to be acquired. In one embodiment, the smart camera 110 may instead include an analog camera that acquires an analog video signal, and the smart camera 110 may further include A/D converters for converting the analog video signal into a digital image.

The smart camera 110 may include a lighting current controller allowing it to directly connect to one or more lighting sources 606. In some embodiments, only one lighting source is used to illuminate a part being examined. In some embodiments, multiple lighting sources are used to illuminate a part being examined, such as three separate lighting sources that provide Red, Green, and Blue (RGB) illumination. As explained below, the lighting current controller may be operable to pulse the one or more lighting sources such that the one or more lighting sources are turned on only for duration of the actual exposure of one or more images by the smart camera 110. In some embodiments, the lighting current controller may provide a continuous current to the one or more lighting sources instead of a current pulse.

In the embodiments of FIGS. 2 A-C, the functional unit in the smart camera 110 (or the computer system 102) may control the actuator 192. Examples of motion control functions include moving a part or object to be imaged by a camera, rejecting a part on an assembly line, or placing or affixing components on a part being assembled, or a robotics application, among others.

Figure 3A:
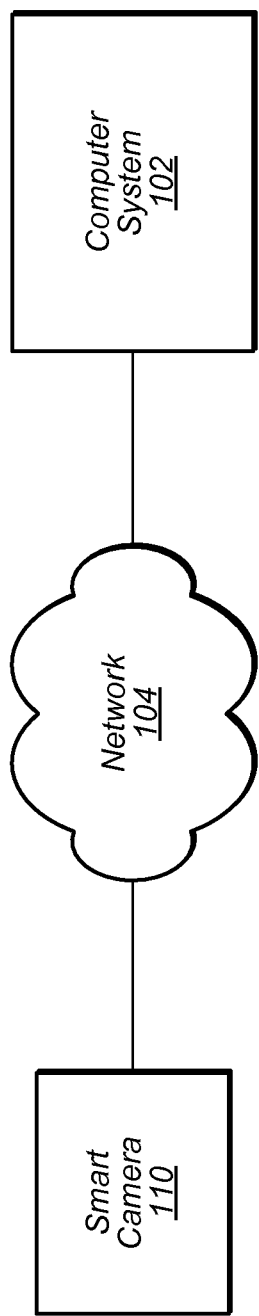
FIGS. 3A-B are diagrams of a smart camera coupled to a computer system via a network.

FIGS. 3 A-B—Image Acquisition System Having a Smart Camera

FIGS. 3 A-B illustrate an image acquisition system with a smart camera 110. The smart camera 110 may include a housing which encloses a portion or all of the smart camera 110 components, or may be comprised on a frame which primarily provides structural support for the smart camera 110 components. In some embodiments, a lens may be attached directly to the housing. In one embodiment, the housing may have a plurality of sides. For example, the plurality of sides may comprise top, bottom, left, right, front and back sides. Therefore, the smart camera 110 may include a housing having a plurality of sides and a lens directly attached to the housing for acquiring an image of an object. In some embodiments, the smart camera may also include all the elements shown in FIGS. 5A-B, 6, and 7, but without the chassis and/or the imager/lens. Thus the smart camera may be built into a custom chassis at a later time and may use a custom and/or external imager/lens.

Figure 3B:
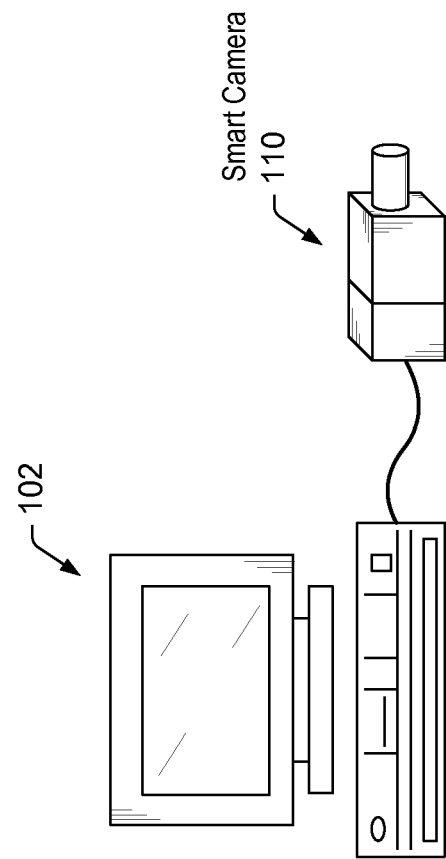

As FIG. 3B also shows, the smart camera 110 may include a chassis which includes a plurality of expansion slots for receiving function modules 108. The function modules 108 may thus provide a mechanism for expanding the capabilities of the smart camera 110 in a modular fashion, such as described in U.S. Pat. No. 7,327,396. In some embodiments, the chassis does not contain any slots for the function modules.

FIGS. 4 A-C—Connectivity Options of a Smart Camera

Figure 4B:
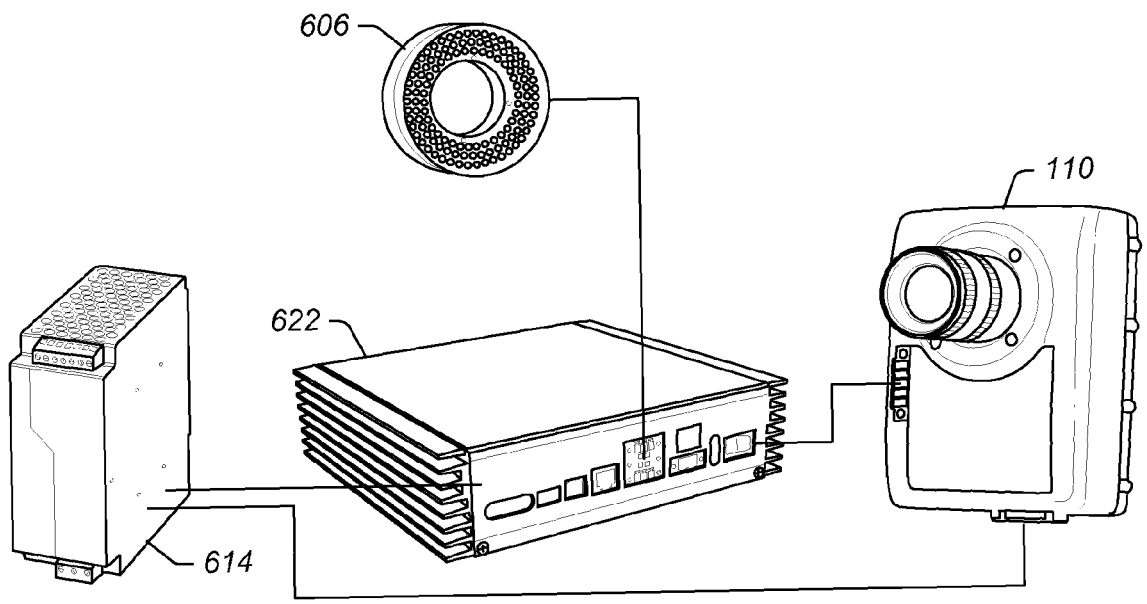
Figure 4C:
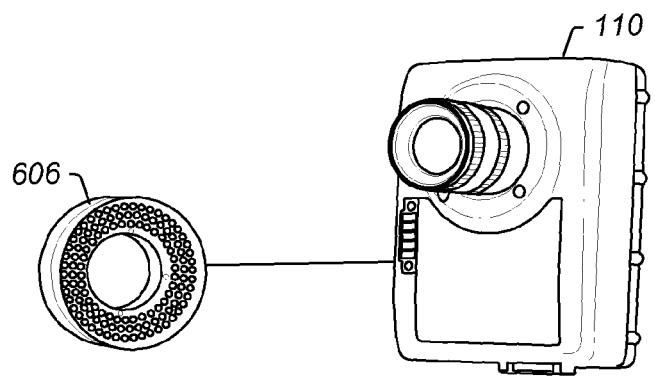

FIGS. 4A-C illustrate some embodiments of various connectivity options of a smart camera with an integrated lighting module. It is noted that the smart camera 110 illustrated in FIGS. 4A-C is meant to be exemplary only, and is not intended to limit the form or function of the smart camera to any particular embodiment.

As indicated in FIG. 4A, in some embodiments, the smart camera 110 may be able to connect to various devices, such as a lens 280, one or more off-the-shelf lighting sources 606, a camera fixture 608 for mounting the smart camera 110, an enclosure 610 such as an all-weather enclosure, direct I/O 612, an external power supply 614, Ethernet expansion I/O 616, operator interface 618 (such as for Human-Machine Interface HMI), and/or software 620, among others. The ability to connect one or more off-the-shelf lighting sources 606 allows the user of the smart camera to directly connect and use various light sources available on the market as needed for the particular application.

FIGS. 4B and 4C show various connectivity options for a smart camera 110, according to some embodiments. FIG. 4B shows how an external lighting current controller 622 may be used in conjunction with the smart camera 110. The smart camera may also include one or more ports (not shown) for connections with one or more external lighting current controllers and/or external power supplies. Also, an external power supply 614 may be used in order to adequately power the one or more external lighting sources 606. In some embodiments the smart camera may be able to synchronize timing of the integrated universal current controller with timing of the external lighting controller. For example, the FPGA and/or the processing unit may ensure that the integrated lighting controller and any external lighting controller are able to illuminate one or more UUT's using proper timing for a desired exposure interval.

FIG. 4C shows how the smart camera 110 with an integrated lighting current controller 290 may be used to directly connect to one or more lighting sources 606, without the need to use either an (additional) external power supply 614 or an external lighting current controller 622. The solution shown in FIG. 4C thus eliminates external hardware elements to save space, power, and cost that can be incurred by using the external hardware elements.

Figure 5A:
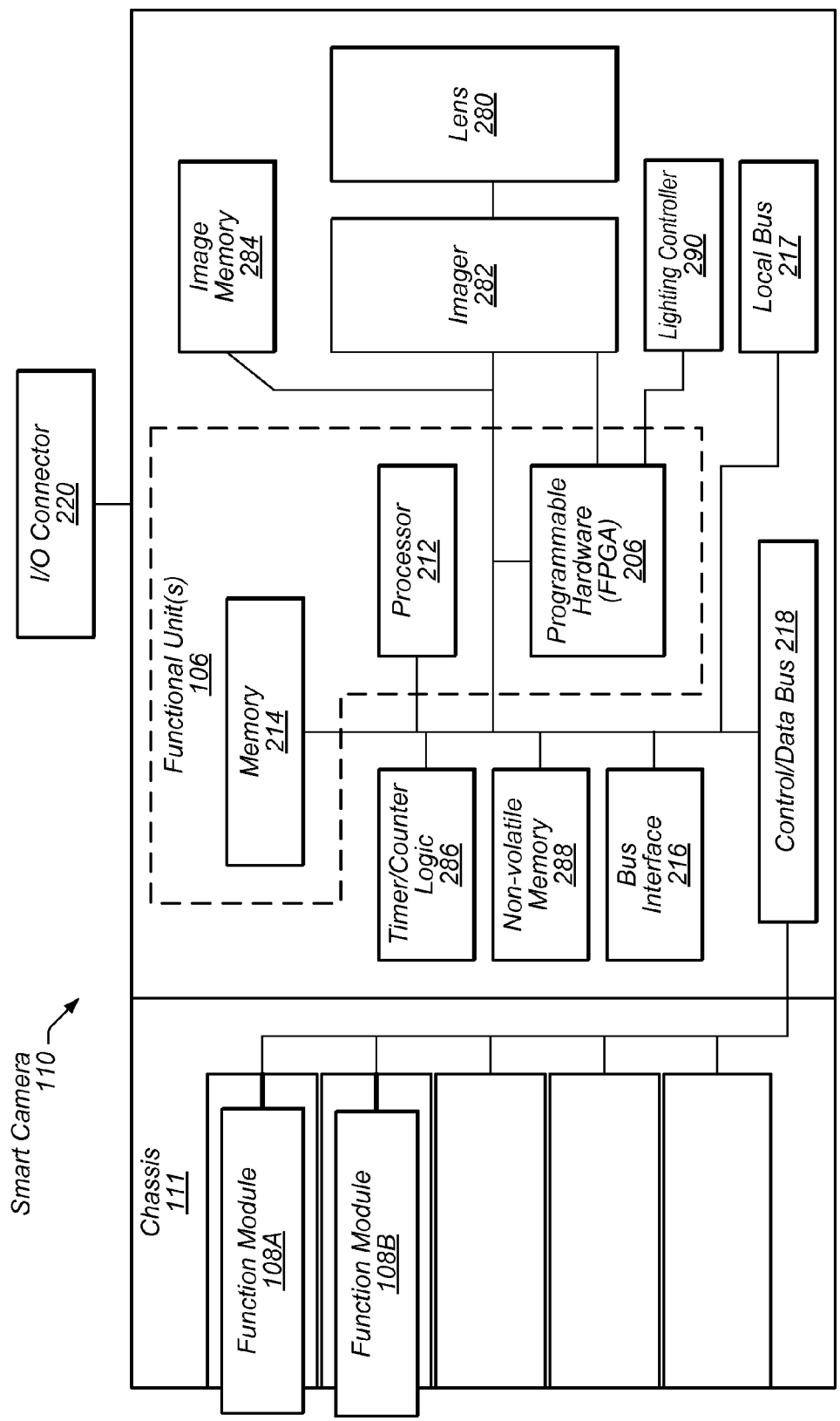
FIG. 5A-B illustrate exemplary block diagrams illustrating some embodiments of a smart camera with an integrated lighting current controller.
Figure 5B:
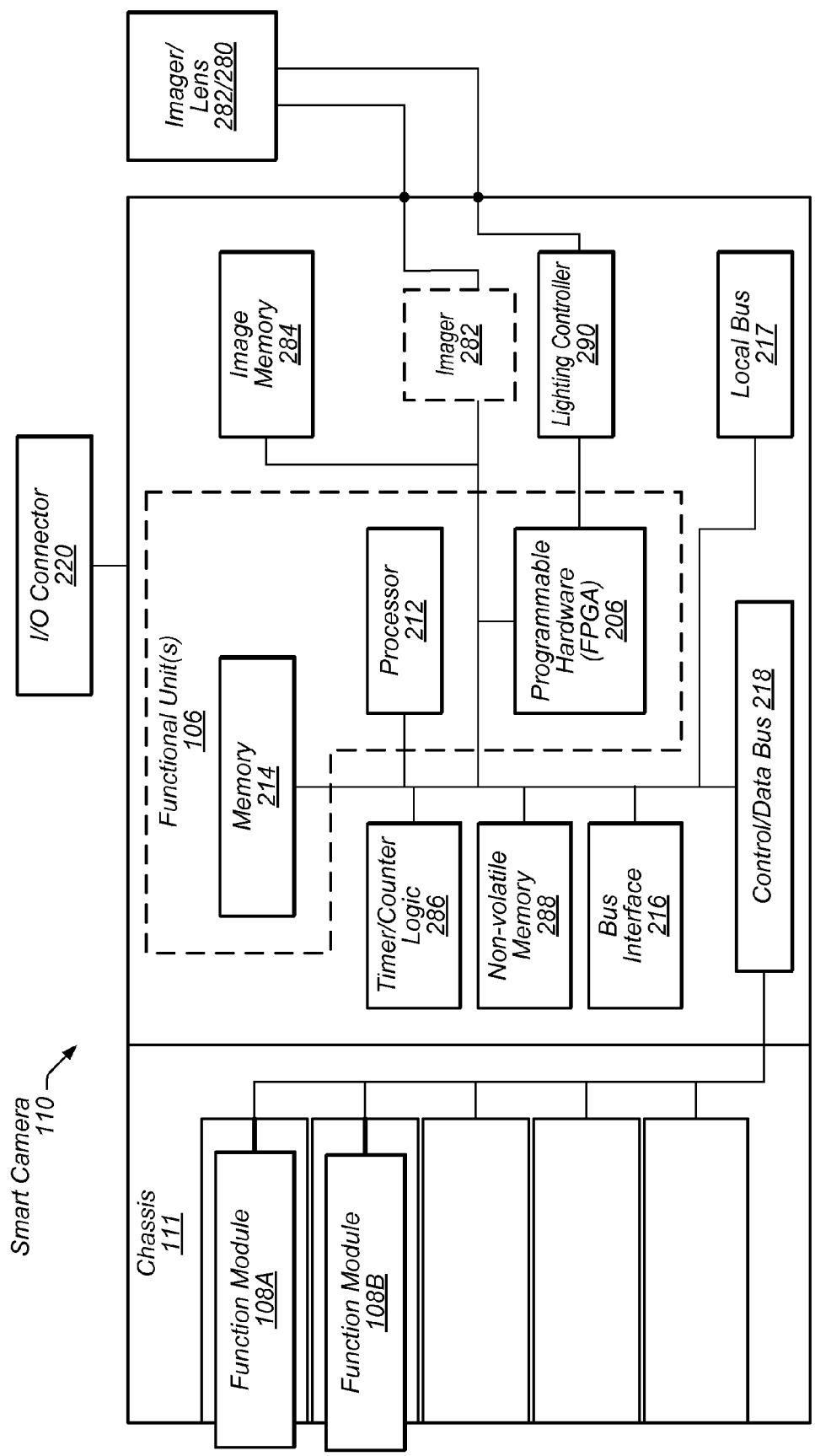

FIG. 5A-B—Smart Camera Block Diagram

FIG. 5A is a block diagram of a smart camera 110 with programmable hardware. As may be seen, this embodiment uses a combination of processor/memory 212/214 and programmable hardware 206, e.g., FPGA, to perform image processing (and/or other) functions. For example, the programmable hardware 206 element in the smart camera 110 may be configurable to perform an image processing function on an acquired image. It should be noted that this embodiment is meant to be illustrative only, and is not intended to limit the architecture, components, or form of the smart camera 110.

The embodiment of the smart camera 110 illustrated in FIG. 5A may include an imager 282 and a lens 280. The smart camera may also include a functional unit 106, which may comprise a programmable hardware element 206, e.g., a field programmable gate array (FPGA), and may also comprise a processor 212 and memory 214. The programmable hardware element 206, processor 212 and memory 214 may each be coupled to the imager 282 and/or to an image memory 284. The smart camera 110 may also include non-volatile memory 288 coupled to the programmable hardware element 206, the processor 212, the memory 214 and the image memory 284.

The smart camera 110 may also include an I/O connector 220 which is operable to send and receive signals. The I/O connector 220 may present analog and/or digital connections for receiving/providing analog or digital signals. For example the I/O connector 220 may enable the smart camera 110 to communicate with computer system 102 (such as the computer system shown in FIG. 3) to receive a program for performing image processing (and/or other) functions. The smart camera 110 may include a dedicated on-board processor 212 and memory 214 in addition to the programmable hardware element 206.

As shown, the smart camera 110 may include image memory 284 which couples to the programmable hardware 206, the imager 282, the processor 212, memory 214, bus interface 216, the control/data bus 218, and a local bus 217. The image memory 284 may be operable to store a portion of an image, or one or more images received from the imager 282. The image memory 284 may enable the programmable hardware 206 and/or the processor 212 to retrieve the one or more images, operate on them, and return the modified images to the image memory 284. Similarly, one or more of the function modules 108 may be operable to retrieve the image from the image memory 284, operate on the image, and return the (possibly) modified image to the image memory 284.

As shown, the smart camera 110 may further include bus interface logic 216 and a control/data bus 218. In one embodiment, the smart camera 110 and/or a function module 108 may comprise a PCI bus-compliant interface card adapted for coupling to the PCI bus of the host computer 102, or adapted for coupling to a PXI (PCI eXtensions for Instrumentation) bus.

As shown, in one embodiment, the smart camera 110 may also include local bus interface logic 217. In one embodiment, the local bus interface logic 217 may present a RTSI (Real Time System Integration) bus for routing timing and triggering signals between the smart camera 110 and one or more other devices or cards, such as other smart cameras 110, actuators, smart sensors, and/or lighting current controllers.

In some embodiments, the smart camera 110 may contain an integrated lighting current controller 290 (referred to herein as a "lighting current controller") operable to couple to one or more external light sources. The lighting current controller may be operable to control the one or more external light sources using a current signal (e.g., a current pulse) to provide illumination for acquisition of an image of the UUT. Further discussion of the lighting current controller is shown below with respect to FIGS. 6-8.

FIG. 5B illustrates some embodiments of an embedded vision system with an integrated lighting module that can be used with an external imager 282 and/or lens 280. In some embodiments, an embedded vision system may be used as a smart camera. One of the differences between the embedded vision system and the smart camera described in previous figures is that the embedded vision system does not necessarily include a built-in imager 282/lens 280. Instead, the embedded vision system may couple to an external imager 282/lens 280 in order to acquire one or more images. The external camera/lens may be a digital camera or it may be an analog camera. If the external camera is a digital camera, then it may contain an imager 282, image memory 284, a lens 280, and a digital bus interface to connect to and send one or more digital images back to the embedded vision system. If the external camera is an analog camera, then it may contain an analog bus interface to connect to and send analog images back to the embedded vision system, which would then digitize the received analog images.

In some embodiments, the lighting current controller integrated into the embedded vision system operates in substantially similar manner to that of a smart camera, including providing one or more current signals and/or pulses to one or more external lighting sources as may be needed by the user and/or an application program.

FIG. 6—Block Diagram of a Smart Camera

FIG. 6 illustrates some embodiments of a smart camera including an integrated lighting current controller. In this block diagram various other elements of the smart camera are not shown (such as of FIGS. 5A-B) for reasons of simplicity. It should be noted that this embodiment is meant to be illustrative only, and is not intended to limit the architecture, components, or form of the smart camera 110.

In some embodiments, the smart camera 110 may include a processing unit 206 such as an FPGA, as well as a lighting current controller 290. The smart camera 110 may also contain two or more lighting current controllers 290, where each controller can connect to, control, and power multiple light sources. The smart camera 110 may also contain a lens (not shown) that may operate in conjunction with an imager element 282 (such as a charge couple device, or CCD) that may be able to generate an analog image and/or video upon receiving light from a lens. Other sensor types are contemplated, such as CMOS, CIS, and/or others. In some embodiments, the type, duration, and/or intensity of the current signal provided by the integrated lighting current controller 290 may depend on the type of imager 282 (i.e., imaging element) used by the smart camera 110. In some embodiments, the smart camera may not use the imager element 282, and instead it may connect to an external camera and/or lens (such as an analog or digital camera/lens described above with reference to FIGS. 5A and 5B.)

In some embodiments the lighting current controller may be a universal lighting current controller, meaning that it can connect to almost any off-the-shelf current controlled lighting source. The combination of the processing unit/FPGA 206 may allow the lighting current controller to adapt the switching power supply to almost any off-the-shelf current controlled lighting source, giving the user great flexibility in choosing a proper lighting source for the machine vision application. In some embodiments the universal lighting current controller may be able to automatically sense the current signal requirements necessary for the connected one or more light sources. In some embodiments a user may need to indicate to the smart camera the type and/or requirements of the connected one or more lighting sources.

The analog image data created by the imager 282 and/or an external imaging element may be digitized by one or more ADC's 726. In some embodiments, if an external digital imager is used, then the ADC 726 is not utilized. In some embodiments, the digitized image data can be sent to one or more image buffers 722 (or separate image memory 284 of FIG. 5B). The one or more image buffers 722 may be a part of an FPGA/processing unit 206. The data from the image buffers may then be used by a separate processor, such as the processor 212 of FIG. 5B, to perform an algorithm/image processing/machine vision application.

In some embodiments, the processing unit 206 may include an exposure generation unit 710 that is operable to generate an exposure generation signal 750. The exposure generation unit 710 may generate the exposure generation signal 750 in response to an external or internal trigger input 758 (such as a digital input or crossing of an analog threshold), as well as from a software generated event. The trigger input 758 may immediately trigger an exposure generation signal 750 or a strobe generation signal 752, or there may be a built-in delay prior to the exposure signal and/or the strobe generation signal 752.

A light strobe control generation unit 712 may receive the exposure generation signal 750 and generate a strobe generation signal 752. In some embodiments, the light strobe control generation unit 712 may directly receive the trigger signal 758 instead of receiving the exposure generation signal 750. The light strobe control generation unit 712 may generate the strobe generation signal 752 to turn on the one or more light sources 606 for the exposure time of the camera (e.g., the imager 282). Since it is desirable for the light (e.g., from the one or more light sources 606) to be at full brightness before the exposure starts, the strobe generation signal 752 may slightly precede the actual exposure.

The strobe generation signal 752 may start activation of an active circuit 708. The active circuit may be operable to almost instantaneously activate the switching power supply 718 (which may be a part of the active circuit) and supply a control and power pulse (i.e., a current pulse) 770 to the one or more light sources 606. As mentioned above, the lighting current controller 290 offers the advantage of minimizing power and current usage, and thus may provide sufficient power to the one or more light sources 606 without using any additional external power supplies and with sufficiently low heat dissipation.

In some embodiments, the active circuit 708 may contain a control loop compensation network 730 that, in conjunction with the power supply 718, is able to almost instantaneously create the current pulse. The control loop compensation network 730 may be necessary to supply control values to the switching power supply 718. In some embodiments the control loop compensation network may supply the control values directly to the switching power supply 718.

The active circuit 708 may receive a pulse width modulated (PWM) signal 756 from a light current setpoint generation unit 720, which may be included in the processing unit/FPGA 206, or it may be a separate element from the processing unit. The PWM signal 756 may be filtered and eventually transmitted to the power supply 718. Since the power supply 718 may be a switching power supply, it may use the PWM signal to control how much current to supply (as a percentage of full scale). Thus, the filtered PWM signal (see FIGS. 7A-B) may be received by the power supply 718, which then generates the current pulse 770 as indicated. The PWM signal may be generated from the processing unit 206, and thus may be user/application programmable to a desired output current.

In some embodiments, the compensation sample control generation unit 714 may generate a compensation sample signal 754 to indicate to the ADC in the microcontroller 716 when to sample the voltage in the compensation network 730. This voltage may be the value that determines where the control loop picks up the next time that the output (i.e., the current signal 770) is turned on. Without the sample and hold circuit, this voltage may decay with time, and may cause an incorrect current to be sent through the light source, which in turn may cause a bad exposure and/or damage the light source 606.

Furthermore, this decay may result in an unwanted delay—a period of time when the power supply 718, while turned on, would need to adjust its output (i.e., the current signal 770) because of the lost charge. Thus the microcontroller's 716 ADC may sample the voltage, such as instructed by the FPGA 206 (e.g., using the sample control generation signal 754). The PWM output of the microcontroller 716 may be operable to continually refresh the value (i.e., one of the control values of the control loop) until the next time that the power supply 718 may need to turn on, such as when the next strobe generation signal 752 arrives at the active circuit 708 from the processing unit 206.

One way to implement this is through a microcontroller with integrated multichannel ADC and PWM DAC. The ADC is used to sample these voltages when turning off the light, for which the microcontroller is instructed to do so. The PWM DAC may be used to create a replica of these voltages and feed reactive components, such as loop capacitors, to keep them charged at the desired level. Since this state is kept by using active circuitry, the loop memory can be maintained for an arbitrarily long time interval.

Figure 7A:
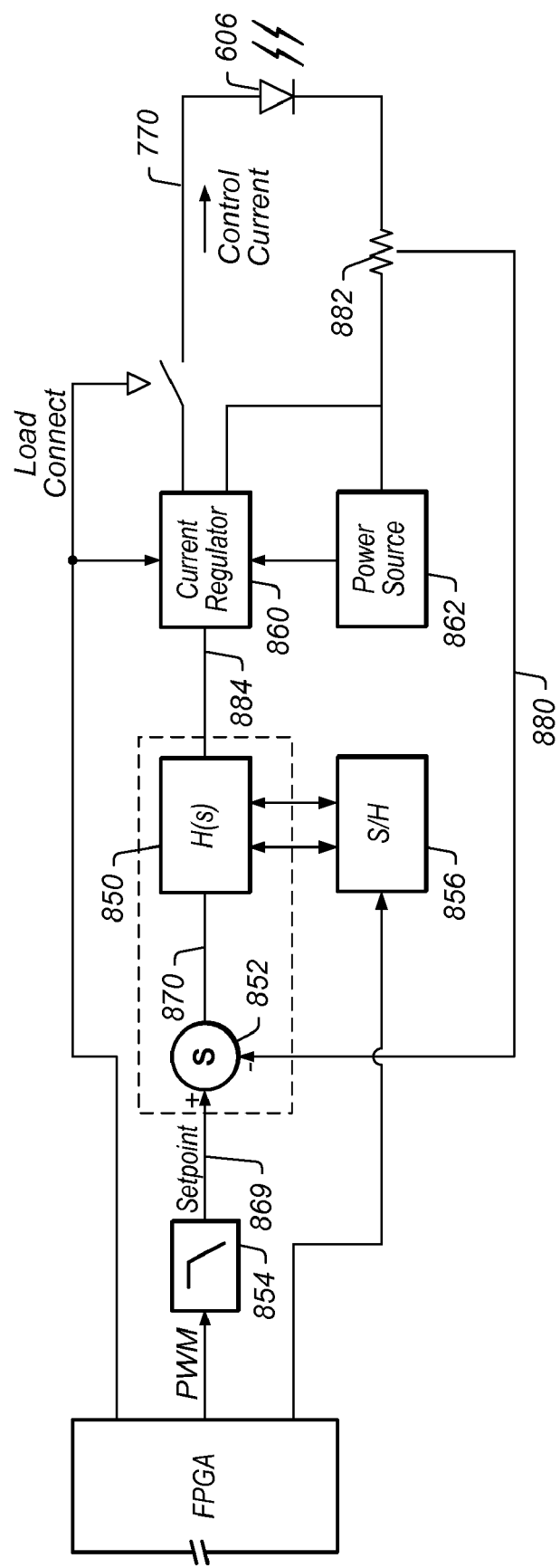
FIGS. 7A-B are block diagrams of an integrated lighting current controller, according to some embodiments.
Figure 7B:
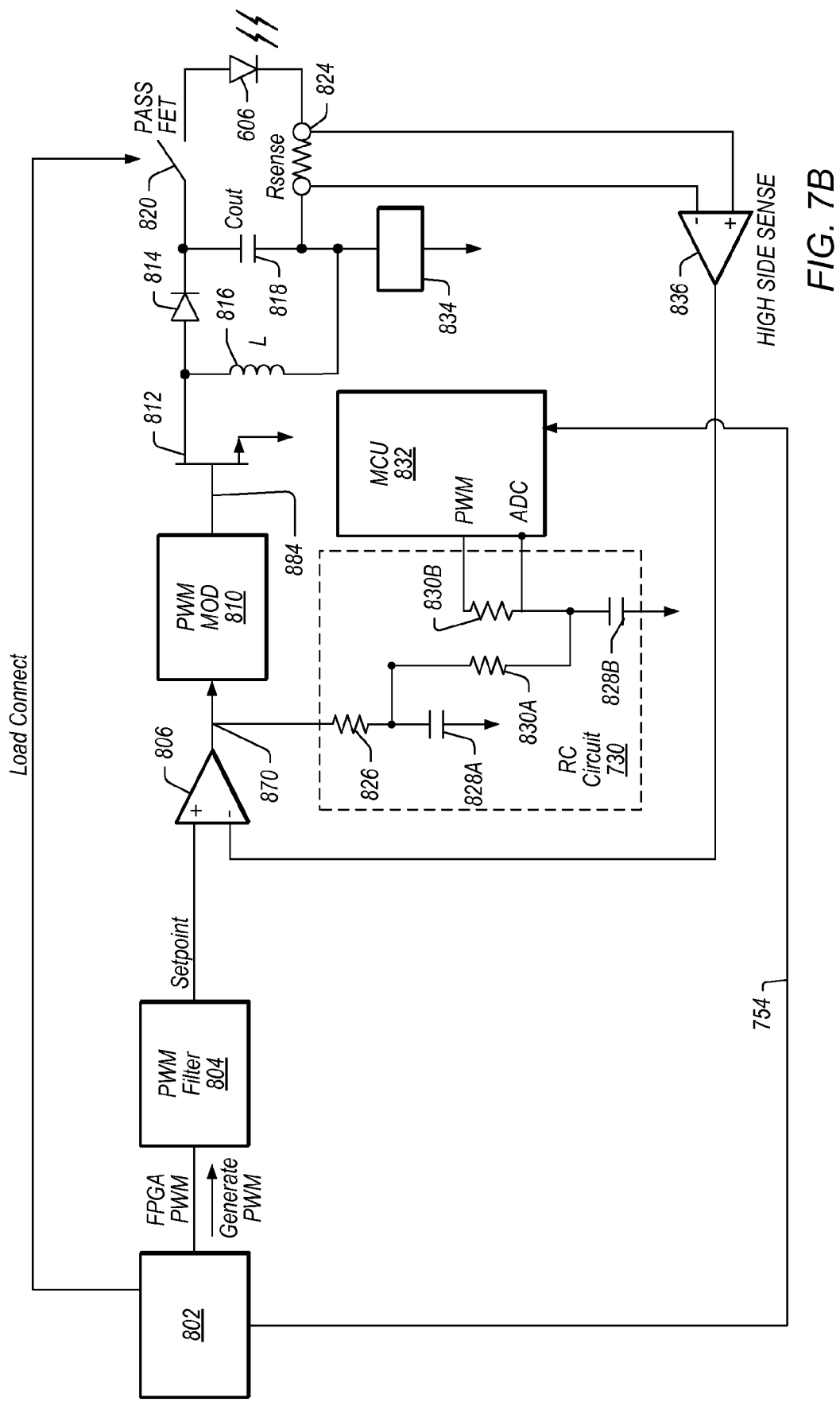

FIGS. 7A and 7B—Block Diagrams of the Lighting current controller

FIG. 7A illustrates some embodiments of the integrated lighting current controller, and especially the control loop. It should be noted that this embodiment is meant to be illustrative only, and is not intended to limit the architecture, components, or form of the lighting current controller.

The active circuit 708 may use a control loop, as mentioned above, to properly regulate the switching power supply. However, control loops may take significant time to establish their final control value after starting from their initial state; in other words, when all the reactive components of the system may be discharged. Adjustments to some of the one or more control variables may occur faster because they represent a smaller percent variation of the output signal. In some cases, it may be necessary to have a memory of the state of the control loop so it can be stopped and restarted without going through the complete establishment time. In other words, the values of the one or more control variables may need to be acquired and stored for future use. The reactive components of the system may need to be charged to a given energy to remember the last control loop setting, so the control loop can reach the final value in the minimum amount of time possible after an arbitrarily long idle time.

Lighting current controllers for a smart camera can be built using switching power supplies, which may be used as an implementation of a control loop. In some embodiments, a switching supply with a single inductor buck-boost topology can be used. In other embodiments, other topologies of switching supplies may be used. In order to adjust the current pulse 890 to one or more arbitrary values, the current value may be programmed to a specific intensity level (usually by setting the light current).

Alternatively the power supply can provide continuous power to the light sources. Although this would solve any settling time issues, this solution has drawbacks. Many light sources may have the ability to be overdriven at a higher strobing current level. The strobing current level may be higher than a continuous current level, most likely making strobing current levels incompatible with continuous current levels. The use of a switching power supply (e.g., a current regulator) facilitates overdriving of the one or more lighting sources by allowing direct control of the current output. Thus overdriving of a light source may occur when the light source is driven with more current than would normally be appropriate for a regular continuous operation. Due to the short duration of the current pulse, this overdriving can be done without damage to the light source within a range specified by the light manufacturer. Overdriving the lighting source allows the user to obtain more illumination from the same light source than would otherwise be possible.

For a lighting current controller with a switching power supply, the current level may be set by a master processor (e.g., the processor 212 and/or the FPGA 206) in the smart camera, such as by using a DAC. As mentioned above, if no measures are taken, stopping the switching power supply 290 for an arbitrarily long time interval may result in the discharge of all the reactive components. In this event the lighting current controller would need to go through the whole establishment time in order to reach the final value of the light current. As a solution, a digital sample and hold circuit 856 can be implemented to sample all the control values of interest, such as loop voltages, and keep a memory of the loop state. As a result, by keeping the memory of the loop state, the key reactive elements in the control loop can be maintained or restored to their operating/active state.

In order to integrate both of these devices, smart camera and lighting current controller, into one device, the power density of the lighting current controller may need to be increased. Use of a switching power supply to provide the control current (i.e., the current pulse) for the one or more lighting current controllers, while making the power density adequate (in terms of efficiency) may have serious limitations as far as response time. Once the switching power supply has been disabled for a long enough time, it may need a settling time which may be orders of magnitude longer than some possible strobing durations for the one or more light sources (e.g., milliseconds or 100's of microseconds compared to 10's of microseconds).

The lighting controller may be able to turn off the one or more light sources, and ensure that the control current 770 (e.g., the current pulse) can get back to the desired value of the output current as fast as possible. This fast response time provided by the control loop may reduce, or eliminate, any settling time of the power supply when it starts after an arbitrarily long inactivity interval. Thus the lighting current controller can provide the current signal for any strobing duration and interval that may be needed, such as indicated by the user and/or a machine vision application.

Once the desired current pulse is established through the one or more light sources, the values of the control variables inside the switching power supply loop may be stable. In other words, for a fixed current pulse, the transfer function's reactive components may be charged to constant values (e.g., the one or more control values). Although the values of the one or more control variables may vary (e.g., depending on the type of the light source), once they settle into a steady state operation they usually do not change afterwards.

The active circuit may be able to measure the one or more control values of the control loop for the power supply once it has reached steady state operation, and then maintain them while the light is disconnected (i.e., when the power supply is off). Thus state of the control variables for the transfer function 850 may be stored, and the one or more control values of the control loop may be maintained as if the one or more light sources were connected and the control current (e.g., current pulse) was flowing through them. As a result, any settling time for when the one or more light sources are reconnected may be significantly reduced because the steady state operating point for the one or more control values of the control loop is held, and thus the lighting current controller would take considerably less time to get back to the desired control current (e.g., the current pulse).

This can be implemented by using a sample and hold circuit 856 that may measure the one or more control values of the control loop (e.g., the inputs to the H(s) transfer function unit 850). In some embodiments, the sample and hold circuit 856 may store, and/or create a copy, of the measured one or more control values of the control loop. This information may be used to restore or maintain any of the reactive elements inside this RC circuit 730 at working levels (i.e., at active state levels). As a result, since the "working levels" (i.e., from the active state) now became initial conditions, the next time the switching power supply is activated to strobe the one or more light sources, the settling time of the switching power supply should be reduced or even eliminated, substantially independent of the length of any inactivity interval.

The control loop may also use a feedback unit 882 operable to generate a feedback signal 880. A summing unit 852 that may receive the feedback signal 880 and the setpoint PWM signal 869. The summing unit 852 may be further operable to sum the setpoint PWM signal 869 minus the feedback signal 880 to generate an error signal 870. The summing unit 852 may be implemented as an error amplifier 808 of FIG. 7B. The control loop may also use a transfer function unit 850 operable to receive the error signal 870 and generate the intermediate setpoint signal 884 in response to receiving the error signal 870.

In some embodiments, the lighting current controller may need to be initialized the first time the one or more light sources are connected to the system, such that the control loop can settle to the needed levels (which may be unknown until then). The initialization also may allow the lighting current controller to generate a first user and/or application requested current signal and any subsequent current signals with substantially similar timing and current levels. In other words, second and third user and/or application requested current signals may be generated at the same levels and with the same duration as the first user and/or application requested current signal.

Thus, the transfer function unit 850 may be operable to receive the error signal 870 and generate the intermediate setpoint signal 884. The switching power supply (e.g., the current regulator) 860 may be operable to receive the intermediate setpoint signal and generate the current pulse in response to receiving the intermediate setpoint signal and power the one or more light sources 606.

FIG. 7B illustrates some embodiments of the integrated lighting current controller in more detail. In some embodiments, the implementation may be realized using a switching power supply, such as a single inductor buck-boost regulator with programmable current control, and may be based on the Linear Technologies LTC3783 PWM LED Driver and Boost, Flyback and SEPIC Converter, but is not restricted to this specific part. In some embodiments, the switching power supply may include various elements such as a power source 862, inductor 816, transistor 812, a pass FET transistor 820, an output capacitor 818, and a sensing resistor 824. Other implementations of the switching supply are contemplated, and the implementation of this figure is shown for exemplary and explanation purposes only.

In some embodiments, a control voltage may be set using a PWM generated by an FPGA (or other similar unit) 802 that may be programmed by a user and/or an application program. The PWM signal then may be filtered by an FPGA PWM filter module 804. After filtering, the PWM voltage may very across a defined range, which may act as a set point for the current regulator (see element 860 of FIG. 7A) in order to control the output current (i.e., the current pulse) on the load (i.e., the one or more light sources). This voltage may be mapped to output currents between 0 and full scale. In other embodiments, other ranges of output currents and PWM voltages are contemplated. Thus the setpoint generator 720 may be operable to generate the PWM signal to set the one or more control values of the control loop to a desired level.

The current regulator 860 (see FIG. 7A) may use a control loop that may include a sense resistor 836 with a high side sense with an embedded error amplifier 808 and a PWM modulator 810. As mentioned above, when the lighting controller starts from a discharged state, it may need time to achieve the desired level of output due to a delay attributed to soft start circuits, output capacitance and/or loop response time, among others. By using the feedback loop, a control voltage may be kept stored in a capacitor even when the light source is disconnected. The next time the control loop may be activated, the PWM modulator 810 may start on the last duty cycle and thus bypass any settling time. However, as mentioned above, one or more factors such as capacitor discharge, leakage currents on surrounding elements, any PCB losses, contamination etc., may all contribute to decay in this voltage, and thus over time the memory of the correct duty cycle may be lost.

One way to solve this issue is to actively hold the voltage on a capacitor to compensate for these losses. This can be achieved by a sample and hold circuit 856, which in some embodiments may be created using a microcontroller 832 with an integrated ADC (analog-to-digital converter) and PWM DAC (digital-to-analog converter). In some embodiments, one or more control values of the circuit during the active operation, such as a voltage in the control loop (e.g., across a capacitor in the control loop), may be sampled and stored in memory. A copy of the one or more control values may be created using the microcontroller's 832 PWM DAC. For example, the measured and then re-generated voltage may be looped (such as to the capacitor) via a large resistor. The control loop may use an RC circuit 730 to facilitate the sample and hold of the control values. In some embodiments, the RC circuit may include capacitors 828A-B, several resistors 826 and 830A/B, and other elements.

The regulator 860 may disconnect the capacitor during the off time of the strobe. This may create high impedance and thus provide a path to the voltage copy on the PWM DAC from the microcontroller 832. Since this is driven by active circuitry (i.e., the microcontroller 832 and the control loop), the voltage on the capacitor may be maintained for as long as needed, without risk of discharge due to any effects such as leakage, temperature, contamination on the board, among others.

In some embodiments, because the timing of the current pulse should be synchronized to the exposure time of the image sensor to ensure consistent illumination of the object being imaged, an additional input synchronized to the exposure may be sent to the lighting current controller to indicate when to strobe. In other embodiments the synchronization may be achieved in other ways, such as by implementing delay elements on the exposure strobe, or by other means. Since the output capacitors can also be discharged, the FPGA 802 may also send maintenance strobes to the lighting current controller as needed, such as when the delay interval is sufficiently long that the voltage change on the output capacitor is significant. By briefly enabling the switching controller, the maintenance strobe may restore the voltage on any output capacitors. During these maintenance strobes, the load (one or more light sources) may be disconnected to prevent the maintenance strobes from being noticeable to the user.

Thus, a smart camera 110 may utilize a lighting current controller 290 in order to provide a current pulse to one or more light sources. In other words, the smart camera may be able to provide control and power to one or more standard/off-the-shelf light sources without using external lighting current controllers and/or additional power supplies.

Thus embodiments of the invention use many of the aspects of an external lighting current controller with the ease of use of integrated lighting, yet without sacrificing quality. Embodiments of the invention may also allow the user to connect and power almost any off-the-shelf light source directly to the smart camera.

Although the embodiments above have been described in considerable detail, numerous variations and modifications will become apparent to those skilled in the art once the above disclosure is fully appreciated. It is intended that the following claims be interpreted to embrace all such variations and modifications.

What we claim:

1. A smart camera with an integrated universal current controller, the smart camera comprising:
    a processing unit;
    an imager coupled to the processing unit; and
    an integrated universal current controller configured to couple to one or more external light sources, wherein the integrated universal current controller is further configured to generate a current signal to control operation of the one or more external light sources, wherein the integrated universal current controller comprises:
        a switching power supply configured to generate the current signal to provide power to the one or more external light sources; and
        an active circuit configured to implement a control loop to regulate generation of the current signal,
            wherein the active circuit is configured to sample one or more control values of the control loop while the control loop is substantially in an active state, and
            wherein, in response to a control signal or a user-initiated request, the active circuit is configured to restore the one or more control values of the control loop while the control loop is substantially in an inactive state.

2. The smart camera of claim 1, wherein the integrated universal current controller is configurable by the processing unit to generate the current signal with desired timing and at a desired level.

3. The smart camera of claim 1, wherein the processing unit is further configured to control exposure of the imager and to tune timing of the current signal relative to the exposure of the imager.

4. The smart camera of claim 1, further comprising:
    a first port configured to couple to an external lighting controller, wherein the smart camera is configured to control the external lighting controller, and wherein the smart camera is configured to synchronize timing of the integrated universal current controller with timing of the external lighting controller.

5. The smart camera of claim 1,
    wherein the integrated universal current controller further comprises:
        a setpoint generator configured to generate a setpoint pulse width modulation (PWM) signal, wherein the setpoint PWM signal is configured to set the one or more control values of the control loop to a desired level;

a transfer function unit configured to receive the setpoint PWM signal and generate an intermediate setpoint signal, wherein the switching power supply is configured to receive the intermediate setpoint signal and to generate the current signal in response to said receiving the intermediate setpoint signal.

6. The smart camera of claim 5, wherein the transfer function unit is configured to receive a feedback signal indicative of a current output, and to sum to generate an error signal indicative of the difference between the setpoint PWM signal and the feedback signal; and to generate the intermediate setpoint signal based on the error signal.

7. The smart camera of claim 5,
wherein the integrated universal current controller further comprises a PWM filter configured to filter the setpoint PWM signal prior to generating the setpoint pulse.

8. The smart camera of claim 1,
wherein the processing unit comprises a first processing unit configured to process an image provided by the imager; and
wherein the active circuit comprises a second processing unit, wherein the second processing unit is configured to regulate generation of the current signal to control the one or more external light sources.

9. The smart camera of claim 1, further comprising a housing, wherein the processing unit, the imager, and the integrated universal current controller are comprised in the housing.

10. The smart camera of claim 1, wherein the current signal is configured to turn on the one or more lighting sources to provide illumination for acquisition of an image of an object.

11. A smart camera with an integrated current controller, the smart camera comprising:
a processing unit;
an imager coupled to the processing unit; and
an lighting current controller configured to couple to one or more external light sources, wherein the lighting current controller is further configured to generate a current signal to control operation of the one or more external light sources, wherein the lighting current controller comprises:
a current regulator configured to provide power to the one or more external light sources using the current signal, and
an active circuit configured to implement a control loop to regulate generation of the current signal,
wherein the active circuit is configured to sample one or more control values of the control loop while the control loop is substantially in an active state, and
wherein, in response to a control signal or a user-initiated request, the active circuit is configured to restore the one or more control values of the control loop while the control loop is in an inactive state.

12. The smart camera of claim 11, further comprising wherein the lighting current controller is configurable to generate the current signal with desired timing and at a desired level.

13. The smart camera of claim 11, wherein the processing unit is configured to control exposure of the imager and to tune timing of the current pulse relative to the exposure of the imager.

14. The smart camera of claim 11, further comprising:
a first port configured to couple to an external lighting controller, wherein the smart camera is configured to control the external lighting controller, and wherein the smart camera is configured to synchronize timing of the lighting current controller with timing of the external lighting controller.

15. The smart camera of claim 11,
wherein the active circuit comprises a second processing unit separate from the processing unit, wherein the second processing unit is configured to regulate generation of the current signal to control the one or more external light sources.

16. The smart camera of claim 11,
wherein the lighting current controller further comprises:
a setpoint generator configured to generate a setpoint pulse width modulation (PWM) signal, wherein the setpoint PWM signal is configured to set one or more control values of the control loop to a desired level; and
a transfer function unit configured to receive the setpoint PWM signal and generate an intermediate setpoint signal, wherein the current regulator is configured to receive the intermediate setpoint signal and to generate the current signal in response to said receiving the intermediate setpoint signal.

17. The smart camera of claim 16, wherein the transfer function unit is configured to receive a feedback signal indicative of a current output, and to generate an error signal indicative of the difference between the setpoint PWM signal and the feedback signal and to generate the intermediate setpoint signal based on the error signal.

18. The smart camera of claim 11, wherein the processing unit is configured to process an image output by the imager.

19. A camera comprising:
an imager configured to acquire images;
a processing unit configured to process images acquired via the imager;
a lighting controller configured to regulate operation of a light source configured to provide illumination for acquisition of the images, the lighting controller comprising:
a power supply configured to:
generate, during a substantially active state, a pulse of current that is provided to the light source, wherein the pulse of current is configured to strobe the light source such that the light source provides substantial illumination during the substantially active state; and
substantially reduce or eliminate, during a substantially inactive state, current provided to the light source such that the light source is not strobed during the substantially inactive state;
an active circuit configured to:
sample, during the active state, voltages of one or more components within the lighting controller; and
provide, during the substantially inactive state, power to the one or more components to maintain each of the one or more components at a voltage level that is substantially the same as the voltage sampled for each of the respective component during the substantially active state.

20. The camera of claim 19, wherein the light source is disconnected from the power supply during the substantially inactive state such that no current is provided to the light source from the power supply during the substantially inactive state.

21. The camera of claim 19, wherein the one or more components comprise a capacitor such that the voltage level of the capacitor is substantially the same in the substantially active and substantially inactive states.

22. The camera of claim 19, wherein the active circuit comprises a microcontroller comprising:
an analog-to-digital converter (ADC) to provide for sampling the voltages of one or more components within the lighting controller; and
a pulse-width-modulated digital-to-analog converter (PWM DAC) to provide a replica of the sampled voltages to the respective one or more components to provide power to the one or more components to maintain the one or more components at a voltage level that is substantially the same as the voltage sampled during the substantially active state.

23. The camera of claim 19, wherein the active state is trigged in synchronization with an image acquisition such that the light source provides substantial illumination during the image acquisition.

24. The camera of claim 19, wherein the imager, processor and lighting controller are provided in a single housing, and wherein the light source comprises an external light source coupled to the camera.

25. The camera of claim 19, wherein provide, during the substantially inactive state, power to the one or more components to maintain the one or more components at a voltage level that is substantially the same as the voltage sampled during the substantially active state comprises operating a control loop to continuously monitor the voltage level of the component and to regulate power provided to the one or more components based on the monitoring of the voltage level.

* * * * *

UNITED STATES PATENT AND TRADEMARK OFFICE
CERTIFICATE OF CORRECTION

| | | |
|---|---|---|
| PATENT NO. | : 7,915,570 B2 | Page 1 of 1 |
| APPLICATION NO. | : 12/184931 | |
| DATED | : March 29, 2011 | |
| INVENTOR(S) | : Cetrulo et al. | |

It is certified that error appears in the above-identified patent and that said Letters Patent is hereby corrected as shown below:

In the Claims:

Column 14
Line 67, please delete "level;" and substitute -- level; and --.

Column 15
Line 9, please delete "and to sum to generate" and substitute -- and to generate --;
Line 11, please delete "signal; and" and substitute -- signal and --.

Signed and Sealed this
Thirty-first Day of May, 2011

David J. Kappos
*Director of the United States Patent and Trademark Office*